US012563329B2

(12) United States Patent
Zhang

(10) Patent No.: US 12,563,329 B2
(45) Date of Patent: Feb. 24, 2026

(54) VEHICLE-MOUNTED MICROPHONE SYSTEM

(71) Applicant: AAC ACOUSTIC TECHNOLOGIES (SHENZHEN) CO., LTD., Shenzhen (CN)

(72) Inventor: Jinyu Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 164 days.

(21) Appl. No.: 18/399,746

(22) Filed: Dec. 29, 2023

(65) Prior Publication Data

US 2024/0340568 A1      Oct. 10, 2024

Related U.S. Application Data

(63) Continuation of application No. PCT/CN2023/086229, filed on Apr. 4, 2023.

(51) Int. Cl.
H04R 1/08 (2006.01)
B60R 11/02 (2006.01)

(52) U.S. Cl.
CPC .......... H04R 1/086 (2013.01); B60R 11/0247 (2013.01); *H04R 2410/07* (2013.01); *H04R 2499/13* (2013.01)

(58) Field of Classification Search
CPC .. H04R 1/086; H04R 2499/13; B60R 11/0247
USPC .................................................... 381/86, 122
See application file for complete search history.

(56) References Cited

U.S. PATENT DOCUMENTS

2020/0251087 A1 *   8/2020   Schmiedel ....... G10K 11/17857

* cited by examiner

*Primary Examiner* — George C Monikang
(74) *Attorney, Agent, or Firm* — Wiersch Law Group

(57) ABSTRACT

A vehicle-mounted microphone system, including a microphone module and a vehicle body on which the microphone module is mounted. The vehicle body includes an outer surface facing the outside of a vehicle and an inner surface arranged opposite to the outer surface. The microphone module is mounted on the inner surface. The vehicle body is provided with a sound inlet channel of the microphone module. The sound inlet channel includes an arched channel and a sound hole communicated with the arched channel. A first-end opening and a second-end opening of the arched channel are formed on the outer surface and are spaced apart from each other. The sound hole is communicated with the arched channel at the top of the arched channel and forms a sound hole opening on the inner surface. The microphone module receives sound through the sound hole opening.

5 Claims, 3 Drawing Sheets

10

A–A

VEHICLE-MOUNTED MICROPHONE SYSTEM

TECHNICAL FIELD

The disclosure relates to the field of vehicle-mounted devices, and in particular, to a vehicle-mounted microphone system.

BACKGROUND

In recent years, automobiles have gradually developed towards intelligence. As an important part of automobile intelligent interaction, a vehicle-mounted microphone system is required to be provided with microphone modules facing the inside and the outside of a vehicle respectively. The microphone module facing the outside of the vehicle is mounted on an inner surface of a vehicle body. The vehicle body is provided with a sound inlet hole of the microphone module. A waterproof film covering a sound inlet hole is affixed to the inner surface of the vehicle body.

However, the microphone module facing the outside of the vehicle faces two major problems, namely water resistance and wind noise. Regarding the water resistance, on the one hand, when the vehicle is being washed, a water flow impact of a high-pressure water gun makes it difficult for the waterproof film to effectively isolate water droplets, causing the microphone module to fail due to water ingress. On the other hand, after the vehicle is washed, water droplets may remain in the sound inlet hole, causing the microphone module to be unable to receive sound normally. Regarding the wind noise, when the vehicle is traveling, air flows at a high speed along an outer surface of the vehicle body to form turbulence, which may produce wind noise at a position extremely close to the sound inlet hole, seriously affecting normal operation of the microphone module.

Therefore, there is indeed a need to provide a new vehicle-mounted microphone system to solve the above technical problem.

SUMMARY

An objective of the disclosure is to provide a vehicle-mounted microphone system that optimizes water resistance and reduces the impact of wind noise to overcome the above technical problem.

In order to achieve the above objective, the disclosure provides a vehicle-mounted microphone system, including a microphone module and a vehicle body on which the microphone module is mounted, the vehicle body including an outer surface facing the outside of a vehicle and an inner surface arranged opposite to the outer surface, the microphone module being mounted on the inner surface, the vehicle body being provided with a sound inlet channel of the microphone module, wherein the sound inlet channel includes an arched channel and a sound hole communicated with the arched channel, a first-end opening and a second-end opening of the arched channel are formed on the outer surface and are spaced apart from each other, the sound hole is communicated with the arched channel at the top of the arched channel and forms a sound hole opening on the inner surface, and the microphone module receives sound through the sound hole opening.

As an improvement, a waterproof film covering the sound hole opening is affixed to the inner surface, and an annular sealing foam is sandwiched between the waterproof film and the microphone module, the annular sealing foam surrounding the sound hole opening. As an improvement, the arched channel includes a top wall and a bottom wall opposite to the top wall, the bottom wall including a first arc wall, the top wall including a second arc wall arranged corresponding to the first arc wall, a first reverse arc wall extending reversely from one end of the second arc wall, and a second reverse arc wall extending reversely from the other end of the second arc wall, the first-end opening is formed on the outer surface between the first reverse arc wall and the first arc wall, and the second-end opening is formed on the outer surface between the second reverse arc wall and the first arc wall.

As an improvement, a distance from a top end of the first arc wall to the outer surface is 1 mm to 2 mm.

As an improvement, the sound hole is a cylindrical hole, and a distance between the first-end opening and the second-end opening is at least twice a diameter of the sound hole.

As an improvement, the sound inlet channel has an axially symmetrical structure.

In the vehicle-mounted microphone system of the disclosure, a first-end opening and a second-end opening spaced of the arched channel that are formed on the outer surface are spaced apart from each other. When the vehicle is being washed, water flow of the high-pressure water gun generally does not enter from the first-end opening and the second-end opening at the same time. Instead, when water enters one of the openings, the water flow may be discharged from the other opening, which can reduce the direct impact of water flow on the waterproof film. After the vehicle is washed, air may pass through the sound inlet channel and take away the remaining water droplets in the sound inlet channel, ensuring normal sound input of the microphone module, thereby optimizing water resistance. When the vehicle is traveling, wind noise generated by turbulence formed by high-speed flow of the air along the outer surface of the vehicle body may be pushed away by the airflow passing through the sound inlet channel to a region farther away from the sound inlet channel, thereby reducing the impact of wind noise on the microphone module.

BRIEF DESCRIPTION OF DRAWINGS

In order to illustrate the technical solutions in the embodiments of the disclosure more clearly, the accompanying drawings to be used in the description of the embodiments will be briefly introduced below. Obviously, the accompanying drawings in the following description are only some embodiments of the disclosure. For those of ordinary skill in the art, other accompanying drawings can be obtained based on these drawings without creative efforts. In the drawings.

DESCRIPTION OF EMBODIMENTS

The technical solutions in the embodiments of the disclosure will be clearly and completely described below with reference to the accompanying drawings in the embodiments of the disclosure. Obviously, the described embodiments are only some of the embodiments of the disclosure, but not all of the embodiments. Based on the embodiments of the disclosure, all other embodiments obtained by those of ordinary skill in the art without creative efforts fall within the protection scope of the disclosure.

Figure 1:
FIG. 1 is a schematic diagram of a three-dimensional structure of a vehicle-mounted microphone system according to the disclosure.
Figure 2:
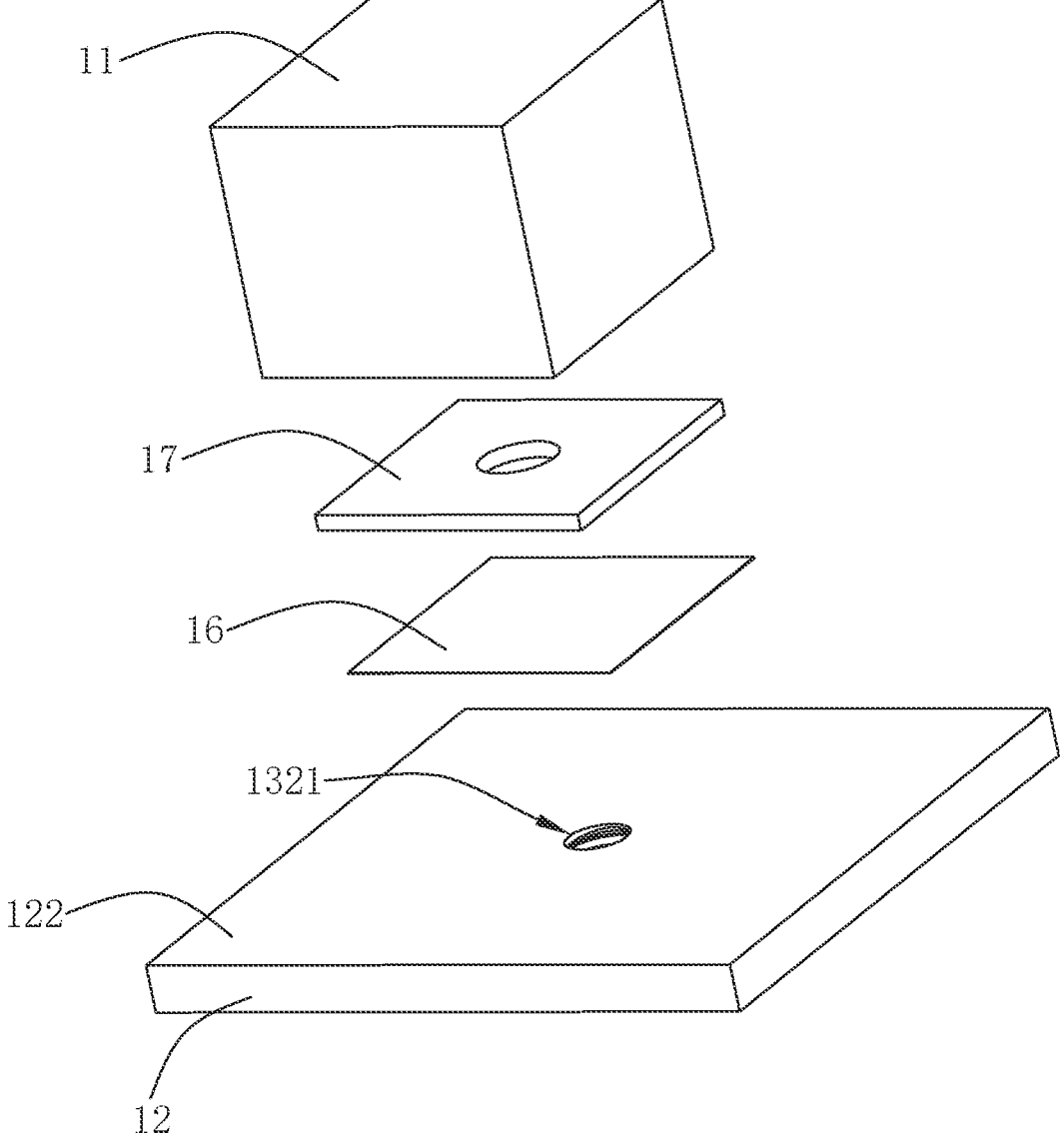
FIG. 2 is a three-dimensional exploded view of the vehicle-mounted microphone system shown in FIG. 1.
Figure 3:
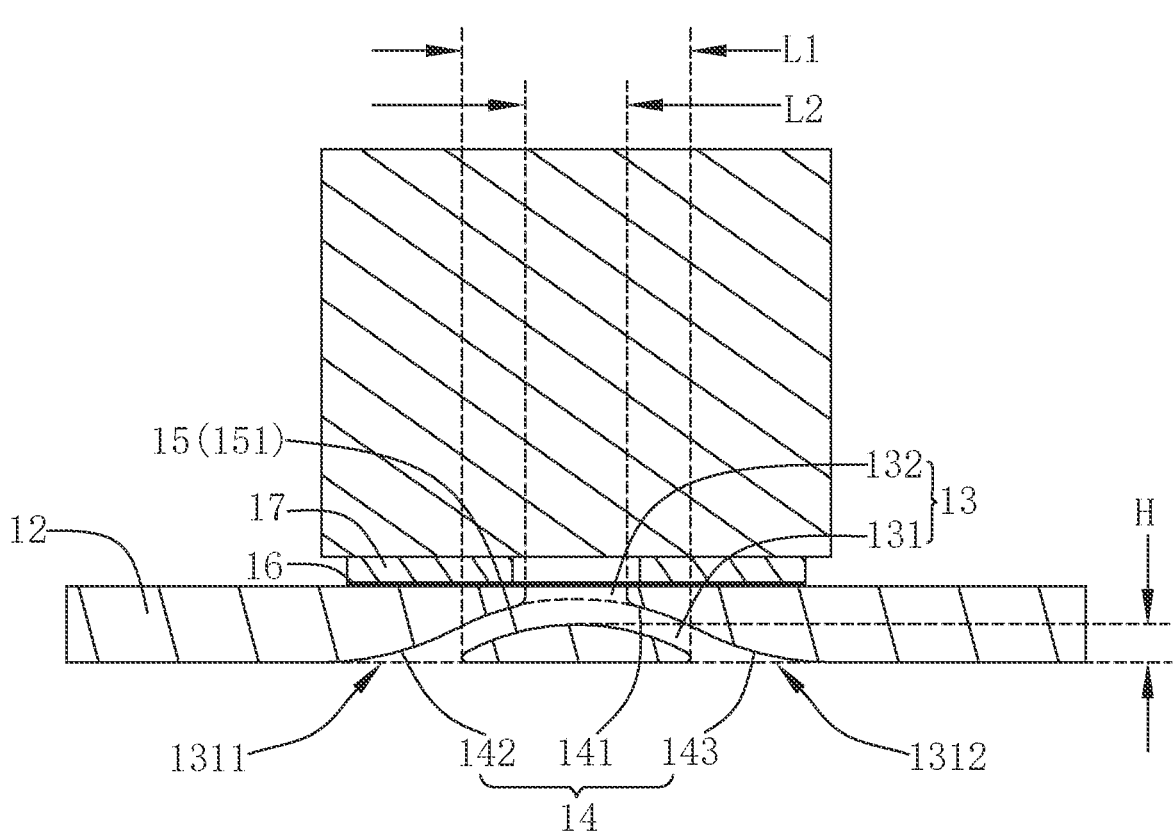
FIG. 3 is a sectional view taken along a line A-A in FIG. 1.

Referring to FIG. 1 to FIG. 3, the disclosure provides a vehicle-mounted microphone system 10. The vehicle-mounted microphone system 10 includes a microphone module 11 and a vehicle body 12 on which the microphone module 11 is mounted.

The vehicle body 12 includes an outer surface 121 facing the outside of a vehicle and an inner surface 122 arranged opposite to the outer surface 121. The microphone module 11 is mounted on the inner surface 122. The vehicle body 12 is provided with a sound inlet channel 13 of the microphone module 11. The sound inlet channel 13 includes an arched channel 131 and a sound hole 132 communicated with the arched channel 131. A first-end opening 1311 and a second-end opening 1312 of the arched channel 131 are formed on the outer surface 121 and are spaced apart from each other. The sound hole 132 is communicated with the arched channel 131 at the top of the arched channel 131 and forms a sound hole opening 1321 on the inner surface 122. The microphone module 11 receives sound through the sound hole opening 1321. As an improvement, the sound inlet channel 13 has an axially symmetrical structure.

A waterproof film 16 covering the sound hole opening 1321 is affixed to the inner surface 122, and an annular sealing foam 17 is sandwiched between the waterproof film 16 and the microphone module 11, and the annular sealing foam 17 surrounds the sound hole opening 1321.

Alternatively, the arched channel 131 includes a top wall 14 and a bottom wall 15 opposite to the top wall 14, the bottom wall 15 includes a first arc wall 151, the top wall 14 includes a second arc wall 141 arranged corresponding to the first arc wall 151, a first reverse arc wall 142 extending reversely from one end of the second arc wall 141, and a second reverse arc wall 143 extending reversely from the other end of the second arc wall 141, the first-end opening 1311 is formed on the outer surface 121 between the first reverse arc wall 142 and the first arc wall 151, and the second-end opening 1312 is formed on the outer surface 121 between the second reverse arc wall 143 and the first arc wall 151.

A distance H from a top end of the first arc wall 151 to the outer surface 121 is 1 mm to 2 mm, which is insufficient to generate eddy currents in the sound inlet channel 13.

The sound hole 132 is a cylindrical hole, and a distance L1 between the first-end opening 1311 and the second-end opening 1312 is at least twice a diameter L2 of the sound hole 132, which helps to solve the problem of simultaneous entry of the water flow of the high-pressure water gun from the first-end opening and the second-end opening during the washing, and also helps to balance reduction of wind noise and sound input of the microphone module.

In the vehicle-mounted microphone system of the disclosure, a first-end opening and a second-end opening spaced of the arched channel that are formed on the outer surface are spaced apart from each other. When the vehicle is being washed, water flow of the high-pressure water gun generally does not enter from the first-end opening and the second-end opening at the same time. Instead, when water enters one of the openings, the water flow may be discharged from the other opening, which can reduce the direct impact of the water flow on the waterproof film. After the vehicle is washed, air may pass through the sound inlet channel and take away the remaining water droplets in the sound inlet channel, ensuring normal sound receiving of the microphone module, thereby optimizing water resistance. When the vehicle is traveling, wind noise generated by turbulence formed by high-speed flow of the air along the outer surface of the vehicle body may be pushed away by the airflow passing through the sound inlet channel to a region farther away from the sound inlet channel, thereby reducing the impact of wind noise on the microphone module.

The above are merely the embodiments of the disclosure. It should be noted herein that, for those of ordinary skill in the art, improvements can be made without departing from the creative concept of the disclosure, but these all fall within the protection scope of the disclosure.

What is claimed is:

1. A vehicle-mounted microphone system, comprising a microphone module and a vehicle body on which the microphone module is mounted, wherein the vehicle body comprises an outer surface facing outside of a vehicle and an inner surface arranged opposite to the outer surface, the microphone module is mounted on the inner surface, and the vehicle body is provided with a sound inlet channel of the microphone module, wherein the sound inlet channel comprises an arched channel and a sound hole communicated with the arched channel, the arched channel comprises a top wall and a bottom wall opposite to the top wall, the bottom wall comprises a first arc wall, the top wall comprises a second arc wall arranged corresponding to the first arc wall, a first reverse arc wall extending reversely from one end of the second arc wall, and a second reverse arc wall extending reversely from the other end of the second arc wall, a first-end opening is formed on the outer surface between the first reverse arc wall and the first arc wall, and a second-end opening is formed on the outer surface between the second reverse arc wall and the first arc wall;

the first-end opening and the second-end opening of the arched channel are formed on the outer surface and are spaced apart from each other, the sound hole is communicated with the arched channel at the top of the arched channel and forms a sound hole opening on the inner surface, and the microphone module receives sound through the sound hole opening.

2. The vehicle-mounted microphone system as described in claim 1, wherein a waterproof film covering the sound hole opening is affixed to the inner surface, an annular sealing foam is sandwiched between the waterproof film, and the microphone module, the annular sealing foam surrounding the sound hole opening.

3. The vehicle-mounted microphone system as described in claim 1, wherein a distance from a top end of the first arc wall to the outer surface ranges from 1 mm to 2 mm.

4. The vehicle-mounted microphone system as described in claim 1, wherein the sound hole is a cylindrical hole, and a distance between the first-end opening and the second-end opening is at least twice as long as a diameter of the sound hole.

5. The vehicle-mounted microphone system as described in claim 1, wherein the sound inlet channel has an axially symmetrical structure.

* * * * *